United States Patent [19]
Yang

[11] Patent Number: 5,594,506
[45] Date of Patent: Jan. 14, 1997

[54] LINE SYNC DETECTOR FOR DIGITAL TELEVISION RECEIVER

[75] Inventor: Jian Yang, Mansfield, Mass.

[73] Assignee: Samsung Electronics Co., Ltd., Suwon, Rep. of Korea

[21] Appl. No.: 534,241

[22] Filed: Sep. 26, 1995

[51] Int. Cl.$^6$ ............................. H04N 7/04; H04N 11/06; H04N 5/10
[52] U.S. Cl. ....................... 348/531; 348/495; 375/366; 375/368
[58] Field of Search ..................................... 348/495, 531, 348/530; 375/343, 368, 365, 367, 366; H04N 7/04, 11/06, 5/10

[56] References Cited

U.S. PATENT DOCUMENTS

| | | | |
|---|---|---|---|
| 4,697,277 | 9/1987 | van Rassel | 348/495 |
| 4,833,694 | 5/1989 | Young et al. | 325/343 |
| 5,416,524 | 5/1995 | Citta et al. | 348/495 |

*Primary Examiner*—Michael H. Lee
*Attorney, Agent, or Firm*—Allen LeRoy Limberg

[57] ABSTRACT

A line sync detector for a digital television receiver receives digital television data including line synchronization code groups of four symbols having successive values of +S, −S, −S and +S at the beginning of each data line, S being a prescribed sample level. A first delay line has an input tap to which the digital television data are supplied, an output tap, first and second intermediate taps, a first symbol latch having an input connection from the input tap and having an output connection to the first intermediate tap, a second symbol latch having an input connection from the first intermediate tap and having an output connection to the second intermediate tap, and a third symbol latch having an input connection from the second intermediate tap and having an output connection to the output tap. The signals at the input tap, the first and second intermediate taps and the output tap of the first delay line are combined in 1:(−1):(−1):1 ratio to generate a combined response. A window detector receives the combined response and generates a response to the combined response whenever successive values of +S, −S, −S and +S occur in the digital television data supplied to the input tap of the first tapped delay line. A correlation filter responds to the response of the window detector for generating a re-inforced response to groups of successive values of +S, −S, −S and +S in the digital television data supplied to the input tap of the first delay line that recur at data line intervals. The reinforced response exhibits peaks when line synchronization code groups occur or are predicted to occur but in fact do not because of noise interference. A threshold detector detects when the reinforced response exceeds a prescribed threshold value in a prescribed polarity, for generating indications of when each line synchronization code group occurs.

15 Claims, 4 Drawing Sheets

LINE SYNC DETECTOR FOR DIGITAL TELEVISION RECEIVER

The invention relates to receivers used for receiving digital television signals and, more particularly, to line sync detectors for such television receivers.

BACKGROUND OF THE INVENTION

In the digital television signals for broadcasting high-definition television (HDTV), each data field contains 314 data lines, and the fields are consecutively numbered modulo-two in order of their occurrence. Each line of data starts with a line synchronization code group of four symbols having successive values of +S, −S, −S and +S. The value +S is one level below the maximum positive data excursion, and the value −S is one level above the maximum negative data excursion. The lines of data are each of 77.7microsecond duration, and there are 832 symbols per data line for a symbol rate of about 10 megabits/second.

The initial line of each data field is a field synchronization code group that codes a training signal for channel-equalization and multipath suppression procedures. The training signal is a 511-sample pseudo-random sequence (or "PR-sequence") followed by three 63-sample PR sequences. This training signal is transmitted in accordance with a first logic convention in the first line of each odd-numbered data field and in accordance with a second logic convention in the first line of each even-numbered data field, the first and second logic conventions being one's complementary respective to each other. The occurrence of the PR sequences can be used to establish beginning of data field indications that can be used for synchronizing the counting of the lines of data, to aid in the identification of the content of each data line.

In order to count the data lines in each successive non-overlapping pair of data fields, it is desirable to determine with a high degree of confidence the occurrence the line synchronization code group of four symbols having successive values of +S, −S, −S and +S at the beginning of each data line. A matched filter can be used to detect the occurrence of the line synchronization code group, but undesirably will also respond to other successive values of +S, −S, −S and +S randomly occurring in the digital television data. Also, if noise interferes with the four symbols in the line synchronization code group at the beginning of each data line, the matched filter response may fail to be generated.

A matched filter for detecting detect the occurrence of the line synchronization code group is constructed as follows. A tapped delay line has an input tap to which the digital television data are supplied, an output tap, first and second intermediate taps, a first symbol latch having an input connection from the input tap and having an output connection to the first intermediate tap, a second symbol latch having an input connection from the first intermediate tap and having an output connection to the second intermediate tap, and a third symbol latch having an input connection from the second intermediate tap and having an output connection to the output tap. The signals at the input tap, the first and second intermediate taps and the output tap are combined in 1:(−1):(−1):1 ratio to generate a combined response. A window detector receives the combined response and generates a response to the combined response whenever successive values of +S, −S, −S and +S occur in the digital television data supplied to the input tap of the first tapped delay line. If the combined response is generated by signed addition of the responses, so as nominally to result in a 4S response to the line synchronization code group, the window detector responds to a window one code level wide centered on 4S response.

The invention resorts to correlation filtering to obtain reinforced response to line synchronization code groups as compared to other successive values of +S, −S, −S and +S randomly occurring in the digital television data. The correlation filtering also provides for filling in occasionally missing responses to line synchronization code groups.

SUMMARY OF THE INVENTION

A line sync detector for a digital television receiver receives digital television data including line synchronization code groups of four symbols having successive values of +S, −S, −S and +S at the beginning of each data line, S being a prescribed sample level. A tapped first delay line has an input tap to which the digital television data are supplied, an output tap, first and second intermediate taps, a first symbol latch having an input connection from the input tap and having an output connection to the first intermediate tap, a second symbol latch having an input connection from the first intermediate tap and having an output connection to the second intermediate tap, and a third symbol latch having an input connection from the second intermediate tap and having an output connection to the output tap. The signals at the input tap, the first and second intermediate taps and the output tap of the first delay line are combined in 1:(−1):(−1):1 ratio to generate a combined response. A window detector receives the combined response and generates a response to the combined response whenever successive values of +S, −S, −S and +S occur in the digital television data supplied to the input tap of the first delay line. A correlation filter responds to the response of the window detector for generating a re-inforced response to groups of successive values of +S, −S, −S and +S in the digital television data supplied to the input tap of the first delay line that recur at data line intervals. A threshold detector detects when the reinforced response exceeds a prescribed threshold value in a prescribed polarity, for generating indications of when each line synchronization code group occurs.

In some embodiments of the invention the correlation filter includes a lowpass finite-impulse-response (FIR) filter. This FIR filter includes a tapped second delay line has an input tap to which the response of the window detector is supplied, an output tap, a plurality of intermediate taps, and a respective plurality of symbol latches equal to the number of symbols in one data line between each of its input and intermediate taps and a succeeding one of its intermediate and output taps. An averager averages the responses at the input tap, the output tap and the intermediate taps of the second tapped delay line, to supply an averager response. This is a correlation procedure for window detector responses to line synchronization code groups, but not to randomly timed groups of successive values of +S, −S, −S and +S. The averager response accordingly exhibits peaks when line synchronization code groups occur or are predicted to occur but in fact do not because of noise interference.

In other embodiments of the invention the correlation filter includes a lowpass infinite-impulse-response (IIR) filter.

patent application Ser No. 08/216,936 filed 24 Mar. 1994 by the inventor and others, and which digital radio receiver includes an adaptive channel-equalization filter.

Figure 1:
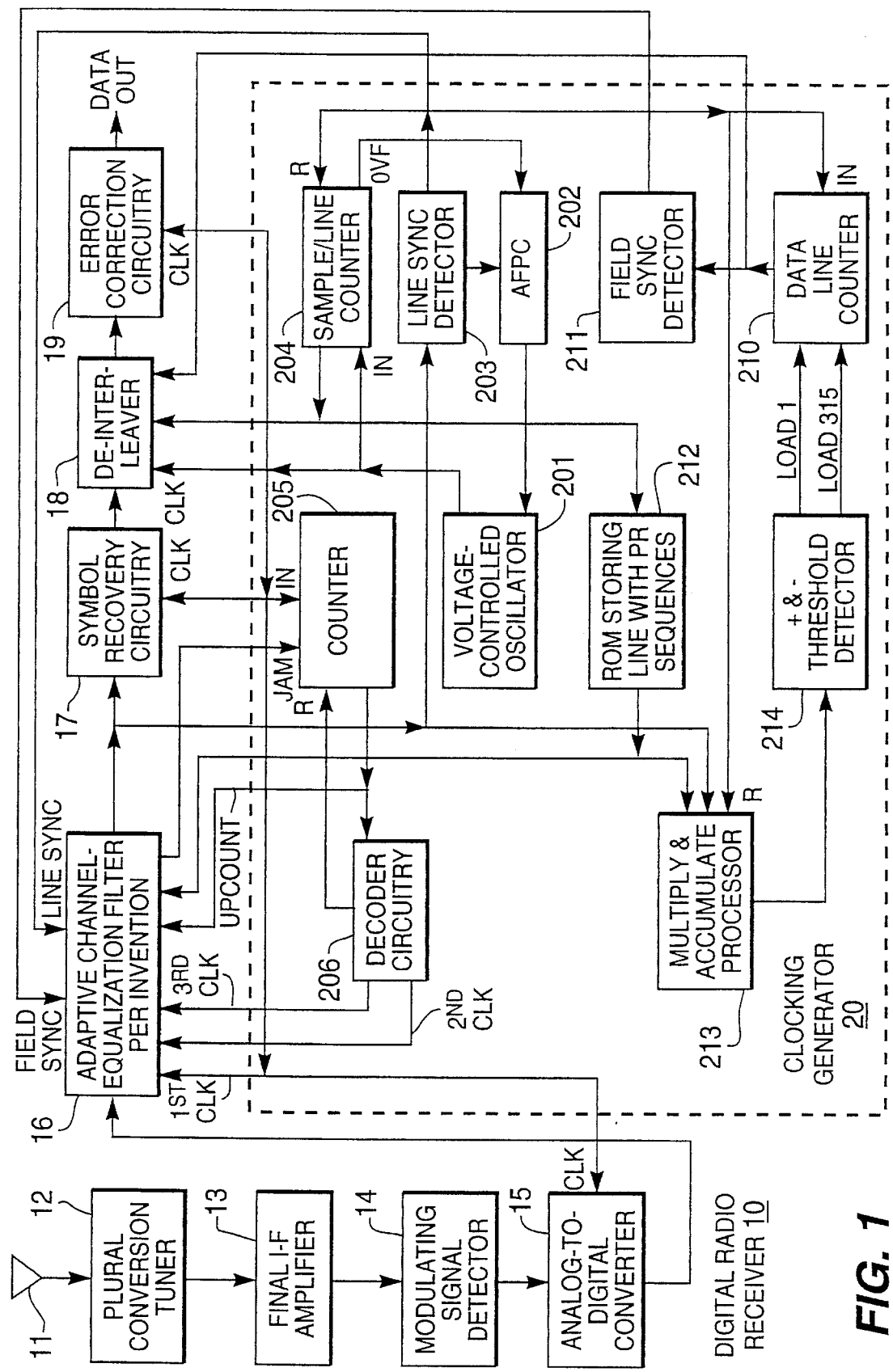
FIG. 1 is a schematic diagram of a digital radio receiver, as may be employed in a high-definition television set, which digital radio receiver is of the type described in U.S.
Figure 2:
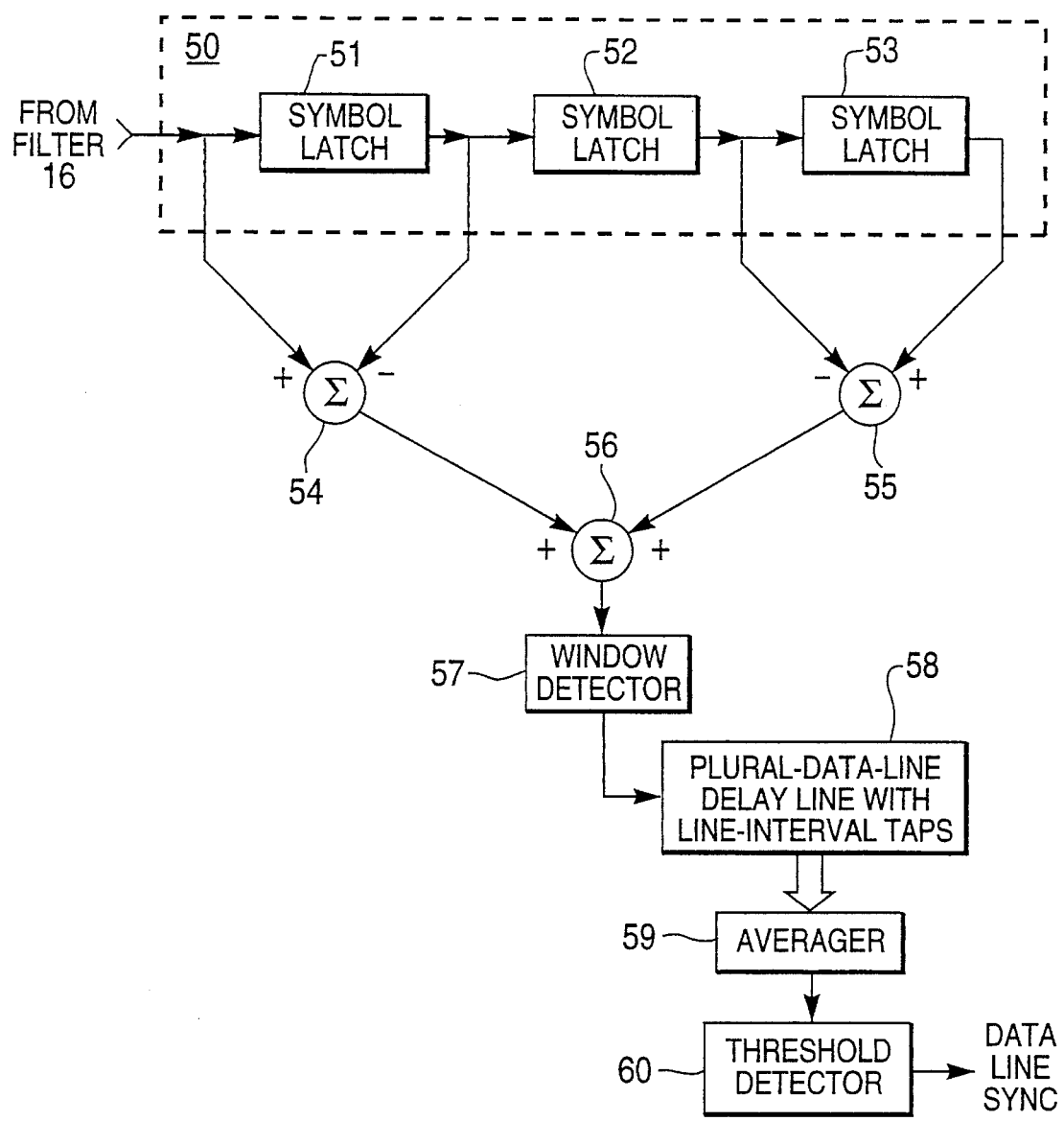

FIG. 2 is a schematic diagram of a line sync detector, which line sync detector is a first embodiment of the invention and can be used in the digital radio receiver of FIG. 1.

Figure 3:
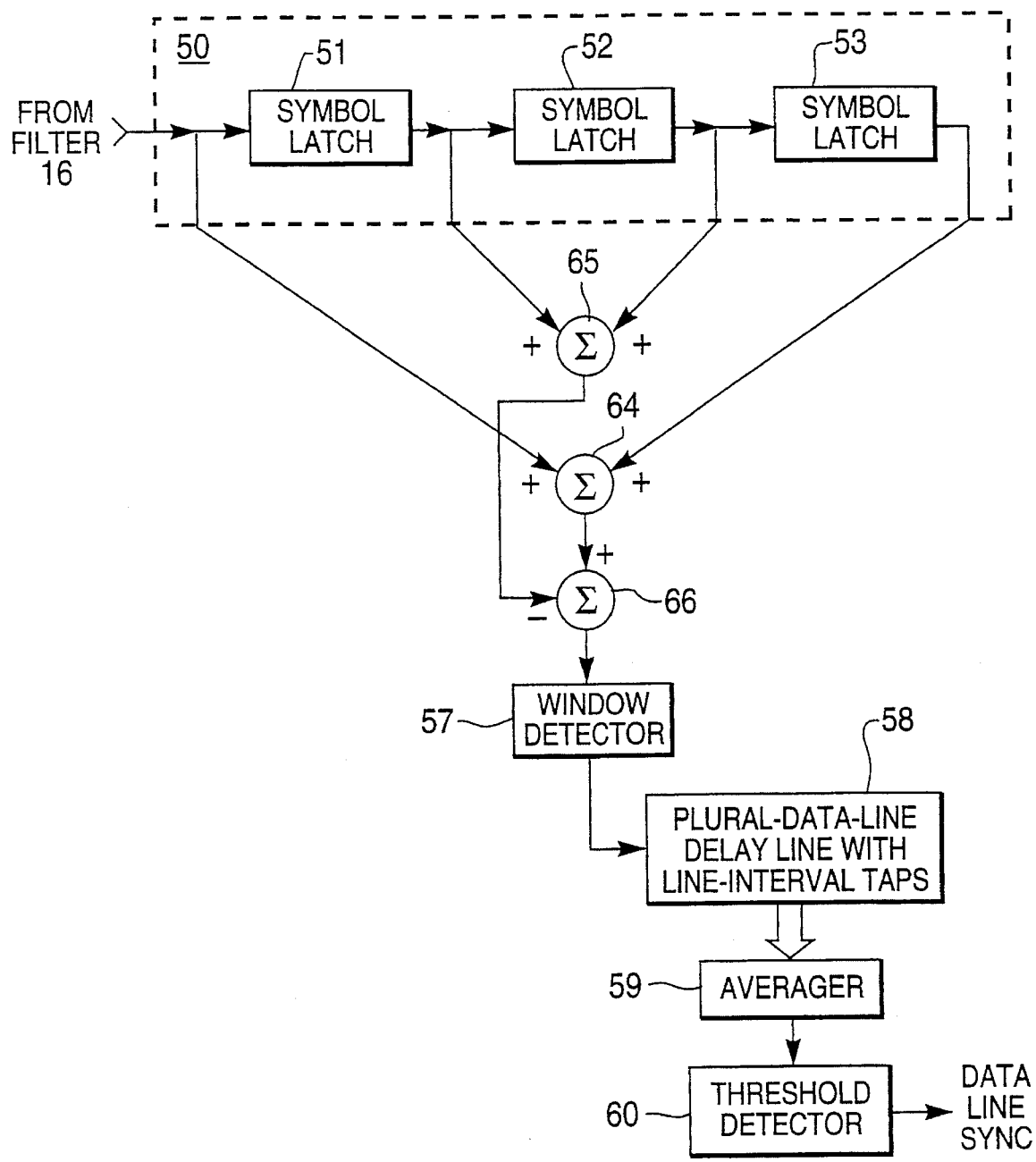

FIG. 3 is a schematic diagram of a line sync detector, which line sync detector is a second embodiment of the invention, alternative to the first embodiment, and can be used in the digital radio receiver of FIG. 1.

Figure 4:
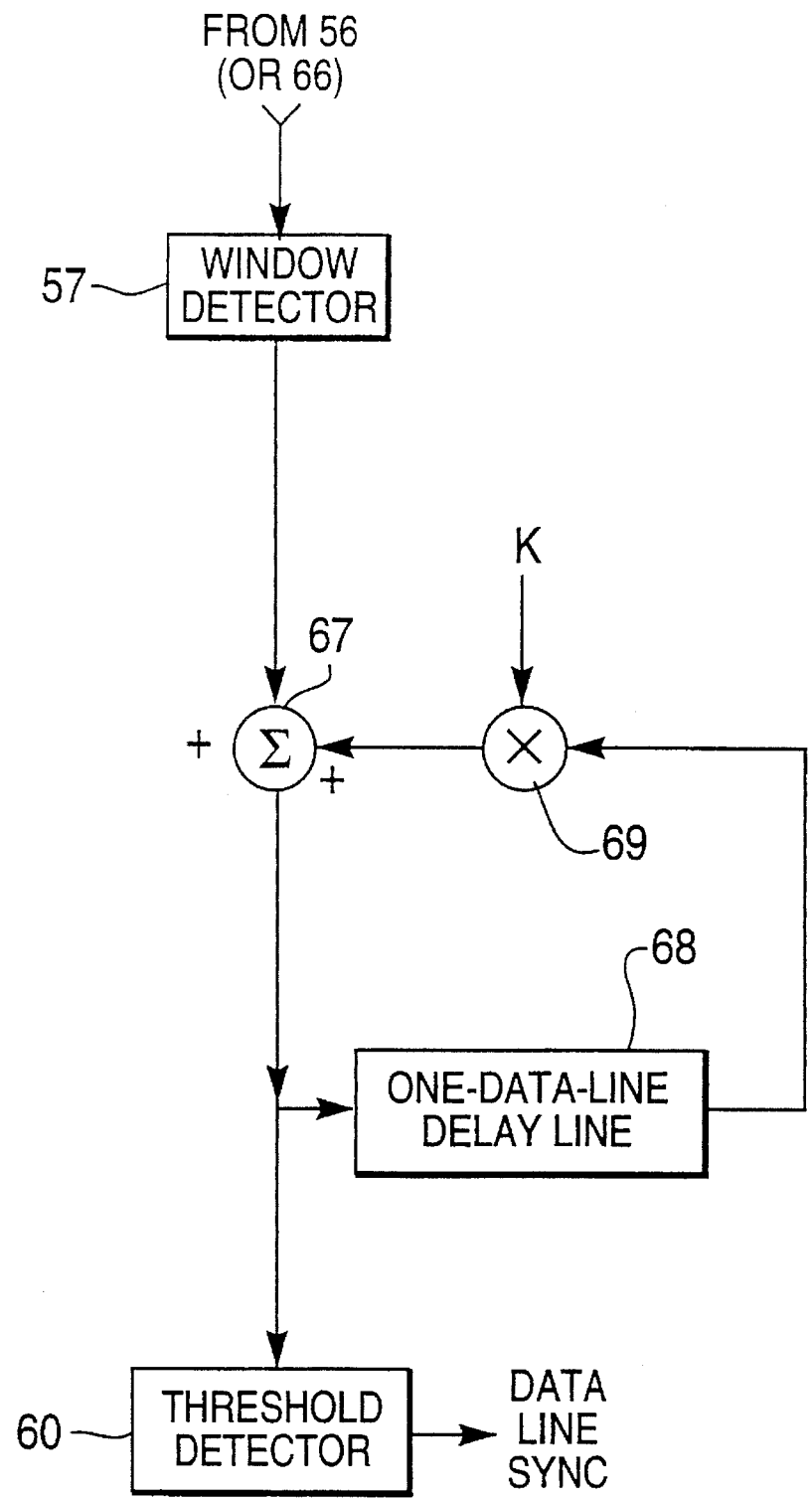

FIG. 4 is a schematic diagram of a modification that can be made to the line sync detectors of FIGS. 2 and 3 in further embodiments of the invention.

DETAILED DESCRIPTION

FIG. 1 shows a digital radio receiver 10 receiving radio frequency (R-F) signals transmitted over-the-air, reception being via a receiving antenna 11. Alternatively, the digital radio receiver 10 can receive R-F signals through a cablecast system, the exact nature by which the receiver 10 receives R-F signals not being a matter of direct concern to the invention. The received R-F signals are supplied to a tuner 12, which supplies intermediate-frequency (I-F) signals to a final I-F amplifier 13. The amplified response of the final I-F amplifier 13 is supplied to a detector 14, which recovers a modulating signal in response to a received carrier wave modulated in accordance with a digital signal and converted to I-F by the tuner 12. This modulating signal is an analog signal encoding the digital signal.

The detector 14 may simply be an envelope detector; or, for better linearity, the detector 14 may be an exalted-carrier detector, a quasisynchronous detector or a synchronous detector. Preferably, the tuner 12 is of a plural-conversion type using more than one intermediate-frequency (I-F) amplifier. Up-conversion of the received R-F signals (in a first detection step) to a few gigahertz first intermediate frequency is preferred for facilitating the construction of the surface-acoustic-wave (SAW) filter required for selecting a desired channel from its neighboring channels. Then, in one type of design for the tuner 12, the first I-F amplifier response is down-converted (in a second detection step) to the conventional 45 MHz intermediate frequency for amplification by a second I-F amplifier (13) and the second I-F amplifier response is detected by a third detector (14). Alternatively, in another type of design for the tuner 12, the first I-F amplifier response is down-converted to the conventional 45 MHz intermediate frequency for amplification by a second I-F amplifier, then down-converted a second time (in a third detection step) for amplification by a third I-F amplifier (13) and the third I-F amplifier response is detected by a fourth detector (14). The invention can be used with these and other types of detection arrangement, including those arrangements using autodyne or homodyne types of final conversion, and including those arrangements in which an analog-to-digital converter is supplied I-F amplifier response directly and the detector 14 is dispensed with.

In the detection arrangement shown in FIG. 1, the analog modulating signal recovered by the detector 14 is digitized by an analog-to-digital converter 15 for application as digital input signal to an adaptive channel-equalization filter 16 that can be constructed as described in U. S. patent application Ser No. 08/216,936 filed 24 Mar. 1994 by Jian Yang et alii; entitled RAPID-UPDATE ADAPTIVE CHANNEL-EQUALIZATION FILTERING FOR DIGITAL RADIO RECEIVERS, SUCH AS HDTV RECEIVERS, and assigned like the inventions described herein to Samsung Electronics Co., Ltd., pursuant to employee agreements to so assign in force at the time the inventions were made. The digital input signal supplied to the adaptive channel-equalization filter 16 is descriptive of the digital signal modulating the received carrier wave, but in most digital transmission schemes is not the same as the digital signal modulating the received carrier wave. The output signal from filter 16 is supplied as digital input signal to symbol recovery circuitry 17, which can be one of the types known generally in the art. The symbol recovery circuitry 17 reproduces, subject to error, the digital information in the digital signal modulating the received carrier wave. The data format of the digital information supplied from the apparatus 17 may conform to that of the digital signal modulating the received carrier wave in some systems, or its data format may be different.

Typically, the digital information supplied from the symbol recovery circuitry 17 is a symbol stream in interleaved form and is accordingly supplied as input signal to a de-interleaver 18. The de-interleaved symbol stream from the de-interleaver 18 is supplied to error-correcting circuitry 19, which corrects errors in the symbol stream responsive to error-correcting codes contained in the symbol stream. The error-correcting circuitry 19 supplies a non-redundant symbol stream as its output signal. This non-redundant symbol stream reproduces the digital information originally supplied for transmission, so long as the error rate in the redundant symbol stream that circuitry 19 receives as input signal does not overwhelm the error-correcting capabilities of the error-correcting codes in that signal. In a high-definition television set the digital data supplied from the error-correcting circuitry 19 is supplied to those portions of the set which separate packets of data, in accordance with header coding in each packet, for application to the video signal reconstruction circuitry and for application to the audio signal reconstruction circuitry.

A clocking generator 20 is a necessary part of the digital radio receiver 10. The clocking generator 20 of FIG. 1 includes a voltage-controlled oscillator 201 that supplies a first clock signal, referred to as a "sample clock", to the elements 15–19 for timing the passage of digital samples through their cascade connections with each other. This first clock signal is generated at a rate referred to in this specification as the "first clocking frequency" which it is convenient to make an integral-power-of-two multiple of the symbol clock rate. Automatic-frequency-and-phase-control (AFPC) circuitry 202 supplies control signal for the VCO 201. A line synchronization detector 203 detects each occurrence of the data line synchronization code group of four symbols having successive values of +S, −S, −S and +S in the response of the channel-equalization filter 16. A LINE-SYNC pulse is generated responsive to the occurrence of each such code group, and these LINESYNC pulses are supplied as input signal to automatic-frequency-and-phase-control circuitry 202. In a frequency-division operation that generates an AFPC feedback signal for application to the AFPC circuitry 202, a sample-per-line counter 204 counts the number of cycles of the first clocking frequency supplied from the VCO 201 and generates an overflow pulse each time the count reaches the number of samples that should occur in a data line. The AFPC circuitry 202 comprises a pulse discriminator for comparing the overflow pulses with the pulses detected by the data line synchronization detector 203 and an AFPC filter for low-pass filtering the pulse discriminator output signal, the AFPC filter response being applied to the VCO 201 an error signal to close the AFPC loop.

There is also circuitry, not explicitly shown in FIG. 1, that, each time AFPC loop phase lock is re-established, is used to make minor phase adjustments of the first clock signal supplied from the VCO 201 to the analog- to-digital converter 15. This circuitry adjusts the sampling done during digitization, so it is in best temporal alignment for minimizing inter-symbol error. Control signal for this circuitry and automatic-gain-control (AGC) signal for adjusting the gain in the final IF amplifier 13 can be developed by suitable detection circuitry in the symbol recovery circuitry 17.

The clocking generator 20 of FIG. 1 further includes counter circuitry 205 that cyclically counts transitions in the first clock signal to generate a count signal, which is supplied to the adaptive channel-equalization filter 16 and to decoder circuitry 206 that generates a second clock signal and in some embodiments a third clock signal for the adaptive channel-equalization filter 16. U.S. patent application Ser No. 08/216,936 describes different variations of the counter circuitry 205 and decoder circuitry 206. In some adaptive channel-equalization filter 16 designs the filter directs the jamloading of the counter circuitry 205, and in other designs the counter circuitry 205 is simply periodically reset to prescribed initial count in response to reset pulses supplied from the decoder circuitry 206.

The more significant bits of a SAMPLE-PER-LINE-COUNT from the counter 204 provide a SYMBOL-PER-LINE-COUNT. The overflow pulses from the sample-per-line counter 204 (or, alternatively, the LINESYNC pulses from the line sync detector 203) are counted by a data line counter 210, which counts up to 628 and then rolls over to unity initial count to generate a DATA-LINE-COUNT. The DATA-LINE-COUNT is supplied as input signal to the field sync detector 211, which includes decoding circuitry for detecting when the DATA-LINE-COUNT is unity or 315 to generate the FIELDSYNC pulses. The SYMBOL-PER-LINE-COUNT and the DATA-LINE-COUNT are supplied to the de-interleaver 18 to be used in addressing random-access memory (RAM) contained therein. It is most convenient, but not necessary, that the data line counter 210 use an arithmetic in which the most significant bit is the modulo-2 DATA-FIELD-COUNT and the less significant bits count the lines per field. This simplifies design of the de-interleaver 18.

The DATA-LINE-COUNT generated by the counter 210 in the digital radio receiver 10 has to be synchronized to the data in the received transmissions. The counter 210 is designed to respond to a first reset signal to jamload zero count into its counter stages and to a second reset signal to jamload 314 count into its counter stages. The SAMPLE-PER-LINE-COUNT from the counter 204 is applied as addressing to a read-only memory 212 which stores a data line including the consecutive PR sequences located per the first line of data in each even-numbered field (line 315 in the data frame). This line of data is recurrently read from the ROM 212 to a multiply-and-accumulate processor 213 as a multiplicand input signal thereto. The processor 213 receives as a multiplier input signal the channel-equalization filter 16 response. The processor 213 accumulates multiplication products in order to generate an accumulated output signal for application to a dual-threshold detector 214. The result of the accumulation is reset to zero at the beginning of each data line, responsive to a LINESYNC pulse supplied to the processor 213 from the line sync detector 203. The accumulated output signal from the processor 213 will be small in amplitude for most lines of data, since they will not be strongly correlated or strongly anti-correlated with the line of data recurrently read from the ROM 212. The initial data line of an even-numbered field strongly correlates with the line of data recurrently read from the ROM 212, to cause a positive-polarity accumulated output signal from the processor 213, which signal is of large enough amplitude to rise above a positive threshold value in the dual-threshold detector 214. The dual-threshold detector 214 responds to this positive threshold value being risen above to supply a first reset signal to the counter 210 to cause 263 count to be jamloaded into its counter stages. The initial data line of an odd-numbered field strongly anti-correlates with the line of data recurrently read from the ROM 212, to cause a negative-polarity accumulated output signal from the processor 213, which signal is of large enough amplitude fall below a negative threshold value in the dual-threshold detector 214. The dual-threshold detector 214 responds to this negative threshold value being fallen below to supply first reset signal to the counter 210 to cause zero count to be jamloaded into its counter stages.

FIG. 2 shows details of the data line sync detector 203 of the invention, used in the digital radio receiver 10 of FIG. 1 designed for the Grand Alliance system. The channel-equalization filter 16 response is supplied to a cascade connection 50 of symbol latches 51, 52 and 53. The channel-equalization filter 16 response is also supplied as a minuend input signal to a digital subtractor 54, which receives a subtrahend input signal from the symbol latch 51. The symbol latch 52 supplies a subtrahend input signal to a digital subtractor 55, which receives a minuend input signal from the symbol latch 53. A digital adder 56 sums the difference output signals of the subtractors 54 and 55. The resulting sum signal from the adder 56 is supplied to a window detector 57, which supplies an output ONE only when the sum output from the adder 56 is in a range more likely descriptive of a data line sync code than any other code group, and which otherwise supplies an output ZERO. That is, the elements 51–56 function as a correlator for data line sync code groups.

To reduce the likelihood that data line sync pulses will be erroneously generated or omitted, the response of the window detector 557 is supplied to a tapped digital delay line 58, having several taps (e.g., 8, 12 or 16) at one-data-line intervals. An averager 59 comprising a respective array of digital adders averages the tap responses of the tapped digital delay line 58 and supplies the result to a further threshold detector 60. The threshold of threshold detector 60 is set so that it responds to at least some large fraction of the tap responses of the tapped digital delay line 58 being ONEs to supply an output ONE as its response, indicative of data line change. When fewer than this fraction of the tap responses of the tapped digital delay line 558 are ONEs, the threshold detector 60 supplies an output ZERO as its response. The response of the threshold detector 60 is used to supply data line sync pulses to the AFPC circuitry 202 of FIG. 1. The response of the threshold detector 60 is used as count input by the data line counter 210 of FIG. 1 and as count reset by the sample-per-line counter 204 when it fails to roll over its count at the proper time.

FIG. 3 shows a modification of the FIG. 2 line sync detector. In FIG. 2 the adder 56 and the subtractors 54 and 55 generate a combined response by combining in 1:(−1):(−1):1 ratio the signals at an input tap, first and second intermediate taps and an output tap of a tapped delay line composed of the cascaded symbol latches 51, 52 and 53. In FIG. 3 this combined response is generated as the difference output signal of a digital subtractor 66 that differentially combines the sum output signals of digital adders 64 and 65. The adder 64 sums the channel-equalization filter 16 response and the output signal from the symbol latch 53. The adder 65 sums the output signals from the symbol latches 51 and 52.

FIG. 4 shows a modification that can be made to either of the line sync detectors of FIGS. 2 and 3. The tapped digital delay line 58 having several taps at one-data-line intervals and the averager 59 of FIGS. 2 and 3 are a lowpass finite-impulse-response (FIR) filter. Several data lines of delay with individual-symbol resolution are needed in the digital delay line 58. Replacing the FIR filter with an infinite-impulse-response (IIR) filter reduces the need for delay with individual-symbol resolution to a single data line of such delay, as provided by a delay line 68, saving considerable hardware and saving some operating power. The response of the window detector 57 is supplied as a first summand to a digital adder 67, the sum output of which is supplied to the inputs of the threshold detector 60 and of the delay line 68. The output of the delay line 68 is multiplied by an attenuation factor k somewhat less than one in the digital multiplier 69 to generate a product supplied to the digital adder 67 as its second summand. Elements 67–69 comprise an IIR filter that provides correlated response to line synchronization code groups.

One skilled in the art will be enabled by the foregoing disclosure to design further embodiments of the invention, and this should be borne in mind when construing the scope of the claims which follow.

What is claimed is:

1. A line sync detector for a digital television receiver, said line sync detector comprising:

a source of digital television data including a line synchronization code group having a prescribed sequence of symbols at the beginning of each data line;

a matched filter receiving said digital television data and generating a matched filter response that is of prescribed value whenever said prescribed sequence of symbols occurs;

a window detector generating a response to said matched filter response having an amplitude within an amplitude window including said prescribed value;

a correlation filter responding to the response of said window detector for generating a re-inforced response to groups of said prescribed sequence of symbols that recur at data line intervals in said digital television data received by said matched filter; and a threshold detector for detecting when said reinforced response exceeds a prescribed threshold value in a prescribed polarity, for generating an indication of when each said line synchronization code group occurs.

2. A line sync detector for a digital television receiver, said line sync detector comprising:

a source of digital television data including a line synchronization code group of four symbols having successive values of +S, −S, −S and +S at the beginning of each data line, S being a prescribed sample level;

a tapped first delay line having an input tap to which said digital television data are supplied, an output tap, first and second intermediate taps, a first symbol latch having an input connection from said input tap and having an output connection to said first intermediate tap, a second symbol latch having an input connection from said first intermediate tap and having an output connection to said second intermediate tap, and a third symbol latch having an input connection from said second intermediate tap and having an output connection to said output tap;

means for combining the signals at said input tap, said first and second intermediate taps and said output tap of said first delay line in 1:(−1):(−1):1 ratio to generate a combined response;

a window detector generating a response to said combined response for detecting any occurrence of said successive values of +S, −S, −S and +S in said digital television data supplied to the input tap of said first delay line;

a correlation filter responding to the response of said window detector for generating a re-inforced response to groups of said successive values of +S, −S, −S and +S in said digital television data supplied to the input tap of said first delay line that recur at data line intervals; and a threshold detector for detecting when said reinforced response exceeds a prescribed threshold value in a prescribed polarity, for generating an indication of when each said line synchronization code group occurs.

3. A line sync detector as set forth in claim 2 wherein said correlation filter comprises:

a tapped second delay line having an input tap to which the response of said window detector is supplied, having an output tap, having a plurality of intermediate taps; and an averager for averaging the responses at the input tap, the output tap and the intermediate taps of said second delay line, to supply an averager response that is received by said threshold detector as aid reinforced response.

4. A line sync detector as set forth in claim 3, wherein said means for combining the signals at said input tap, said first and second intermediate taps and said output tap of said first delay line in 1:(−1):(−1):1 ratio comprises:

a first subtractor for differentially combining the signals at said input tap and said first intermediate tap of said first delay line to generate a first difference signal;

a second subtractor for differentially combining the signals at said output tap and said second intermediate tap of said first delay line to generate a second difference signal; and a digital adder for additively combining said first and second difference signals to generate said combined response.

5. A line sync detector as set forth in claim 3, wherein said means for combining the signals at said input tap said first and second intermediate taps and said output tap of said first delay line in 1:(−1):(−1):1 ratio comprises:

a first adder for additively combining the signals at said input tap and said output tap of said first delay line to generate a first sum signal;

a second adder for additively combining the signals at said first and second intermediate taps of said first delay line to generate a second sum signal; and a digital subtractor for differentially combining said first and second sum signals to generate said combined response.

6. A line sync detector as set forth in claim 2, wherein said correlation filter comprises:

a first digital adder receiving the response of said window detector as a first summand input signal, receiving a second summand input signal, and supplying a first sum signal that is received by said threshold detector as said reinforced response;

a second delay line having an input connection for receiving the first sum signal of said first digital adder, and an output connection; and a digital multiplier for multiplying the delayed first sum signal at the output connection of said second delay line by a factor less than one to generate the second summand input signal for said first digital adder.

7. A line sync detector as set forth in claim 6, wherein said means for combining the signals at said input tap, said first and second intermediate taps and said output tap of said first delay line in 1:(−1):(−1):1 ratio comprises:

a first subtractor for differentially combining the signals at said input tap and said first intermediate tap of said first delay line to generate a first difference signal;

a second subtractor for differentially combining the signals at said output tap and said second intermediate tap of said first delay line to generate a second difference signal; and a second digital adder for additively combining said first and second difference signals to generate said combined response.

8. A line sync detector as set forth in claim 6, wherein said means for combining the signals at said input tap, said first and second intermediate taps and said output tap of said first delay line in 1:(−1):(−1):1 ratio comprises:

a second adder for additively combining the signals at said input tap and said output tap of said first delay line to generate a second sum signal;

a third adder for additively combining the signals at said first and second intermediate taps of said first delay line to generate a third sum signal; and a digital subtractor for differentially combining said second and third sum signals to generate said combined response.

9. A line sync detector as set forth in claim 1 wherein each said line synchronization code group is composed of four symbols having successive values of +S, −S, −S and +S at the beginning of a respective data line, S being a prescribed sample level.

10. A line sync detector as set forth in claim 1 wherein said matched filter is of a type generating said matched filter response of said prescribed value whenever four consecutive symbols having successive values of +S, −S, −S and +S occur, S being a prescribed sample level.

11. A line sync detector as set forth in claim 10 wherein said matched filter comprises:

a tapped first delay line having an input tap to which said digital television data are supplied, an output tap, first and second intermediate taps, a first symbol latch having an input connection from said input tap and having an output connection to said first intermediate tap, a second symbol latch having an input connection from said first intermediate tap and having an output connection to said second intermediate tap, and a third symbol latch having an input connection from said second intermediate tap and having an output connection to said output tap; and means for combining the signals at said input tap, said first and second intermediate taps and said output tap of said first delay line in 1:(−1):(−1):1 ratio to generate a combined response.

12. A line sync detector as set forth in claim 11 wherein said window detector is of a type for generating a response to said combined response for detecting any occurrence of said successive values of +S, −S, −S and +S in said digital television data supplied to the input tap of said first delay line.

13. A line sync detector as set forth in claim 1 wherein said correlation filter comprises:

a tapped delay line having an input tap to which the response of said window detector is supplied, having an output tap, having a plurality of intermediate taps; and an averager for averaging the responses at the input tap, the output tap and the intermediate taps of said delay line, to supply an averager response that is received by said threshold detector as said reinforced response.

14. A line sync detector as set forth in claim 1, wherein said correlation filter comprises:

a digital adder receiving the response of said window detector as a first summand input signal, receiving a second summand input signal, and supplying a sum output signal that is received by said threshold detector as said reinforced response;

a delay line having an input connection for receiving the sum output signal of said digital adder, an output connection; and a digital multiplier for multiplying the delayed sum output signal at the output connection of said delay line by a factor less than one to generate the second summand input signal for said digital adder.

15. A line sync detector as set forth in claim 10 wherein said window detector is of a type for generating a response to said combined response for detecting any occurrence of successive values of +S, −S, −S and +S in said digital television data supplied to the input of said matched filter.

\* \* \* \* \*